United States Patent [19] [11] 4,138,300
Kaetsu et al. [45] Feb. 6, 1979

[54] PROCESS FOR PRODUCING A TRANSPARENT SHAPED POLYMERIC PRODUCT

[75] Inventors: Isao Kaetsu; Hiroshi Okubo; Fumio Yoshii, all of Takasaki, Japan

[73] Assignee: Japan Atomic Energy Research Institute, Tokyo, Japan

[21] Appl. No.: 670,170

[22] Filed: Mar. 24, 1976

[30] Foreign Application Priority Data

Mar. 26, 1975 [JP] Japan .................................. 50-35375

[51] Int. Cl.² ........................ C08F 2/54; C08F 220/14
[52] U.S. Cl. .......................... 204/159.22; 204/159.23; 526/273; 526/320
[58] Field of Search ................. 204/159.23, 159.22; 526/318, 320, 273

[56] References Cited

U.S. PATENT DOCUMENTS

| 3,754,054 | 8/1973 | Kimura et al. | 526/318 X |
| 3,770,491 | 11/1973 | Spoor et al. | 526/318 X |
| 3,817,946 | 6/1974 | Ree | 526/273 X |
| 3,822,089 | 7/1974 | Wichterle | 264/1 X |
| 3,983,083 | 9/1976 | Kaetsu et al. | 526/240 |
| 3,988,274 | 10/1976 | Masuhara et al. | 526/318 X |
| 3,988,305 | 10/1976 | Stol et al. | 526/318 X |
| 4,010,088 | 3/1977 | Okubo et al. | 204/159.24 |

Primary Examiner—Wilbert J. Briggs, Sr.
Attorney, Agent, or Firm—Browdy and Neimark

[57] ABSTRACT

This invention provides a process for producing a transparent shaped polymeric product which is free from defects such as strain and bubbles and has improved chemical and physical properties. The product is produced from a methyl methacrylate- or methyl acrylate-based monomer mixture by cast polymerization for a significantly shortened time.

13 Claims, No Drawings

PROCESS FOR PRODUCING A TRANSPARENT SHAPED POLYMERIC PRODUCT

BACKGROUND OF THE INVENTION

This invention relates to a process for efficiently cast molding a transparent polymeric product which is free from defects such as strain and has improved properties, for example, of transparency, weather resistance, impact resistance and heat resistance.

It is well known that transparent polymeric materials are substituting for some applications of inorganic glass by virtue of their advantageous properties such as light weight, improved fabricability (processability) and impact resistance. Their importance as materials for safety glass has also been recognized in recent years.

A transparent polymeric material that is currently most commonly used is polymethylmethacrylate, which is less expensive and has improved transparency, appearance, impact resistance, and weather resistance. For these advantages, the polymethylmethacrylate is used in a wide variety of applications such as interior decoration, displays, building materials like ceilings or doors, window glass of passenger vehicles, and aquaria. But in other respects, for example, surface hardness, heat resistance and chemical resistance, the polymethylmethacrylate is not highly desirable. The properties mentioned above can be improved by incorporating into the polymethylmethacrylate those polyfunctional monomers which are capable of providing polymers having high heat resistance or surface hardness, but then in turn, the thus treated polymethylmethacrylate becomes less thermoplastic and it is difficult to mold and process a copolymer from it. This difficulty in molding requires cast polymerization, but to produce a product free from such drawbacks as strain or bubbles, this process takes a long polymerization time. The production, for example, of polymeric product 1 cm thick in a plate glass form requires at least 24 hours. A thicker product is cast polymerized only after a period ranging from some 50–60 hours up to about 500–600 hours. This is without doubt too uneconomical for the commercial production of a desired cast molded article.

It is therefore plain to see that the development of a cast polymerization process for producing efficiently and rapidly those polymethylmethacrylates, representative of polymers of lower alkyl acrylates or methacrylates, which have improved heat resistance, chemical resistance and surface hardness will be greatly advantageous and contribute noticeably to commercial acceptance of transparent plastics materials in the art concerned. As such technique, this invention provides a process for cast polymerizing quickly as well as efficiently polymethylmethacrylate having improved properties.

SUMMARY OF THE INVENTION

One object of this invention is to improve the heat resistance, chemical resistance and surface hardness of the polymethylmethacrylate. In general, polymeric materials, as they are polymerized, have increased heat resistance and chemical resistance but their impact resistance is poor. Improved heat resistance and chemical resistance are only compatible with high impact resistance if two or more monomers of specified structures are blended with each other at specified proportions.

DETAILED DESCRIPTION OF THE INVENTION

According to one aspect of this invention, the following components (A), (B) and (C) are mixed and the mixture is poured into a cell or mold and irradiated with light or an ionizing radiation at a temperature below room temperature to produce a cast polymeric product. The components are specified as follows:

(A) methyl methacrylate and/or its prepolymer;

(B) a monomer represented by the formula

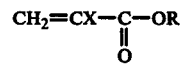

wherein X is H or $CH_3$ and R is alkyl having 2–6, preferably 4–6, carbon atoms, or

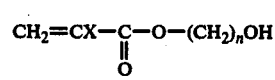

wherein X is as defined above and n is an integer of 3–7, a mixture thereof and/or prepolymer thereof, and (C) a monomer represented by the formulae

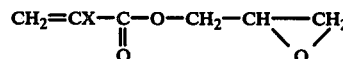
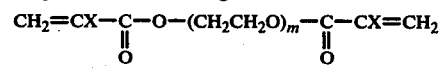

wherein X is defined as above and m is an integer of from 2 to 4, a mixture thereof and/or a prepolymer thereof.

The components (A), (B) and (C), each in an amount ranging from 20 to 50% by weight, are mixed, the total amount of the components being 100% by weight.

According to another aspect of the invention, a copolymerizable monomer (D) in an amount less than 20% by weight based on the total amount of the components is added in addition to the components to form a polymerizable mixture which may be polymerized in a manner similar to that of the mixture mentioned above to produce a transparent cast polymeric product. Preferable examples of the monomer (D) will be specified hereinbelow.

According to a further aspect of this invention, a component (E) which is one or more compounds represented by the formulae

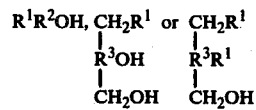

wherein $R^1$ is —OH, —$OR^4$ or —$OOCR^4$ in which $R^4$ is alkyl having carbon atoms of from 1–20; $R^2$ is straight or branched chain alkylene having carbon atoms of from 1 to 10 or

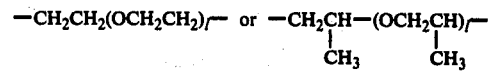

wherein l is an integer from 1 to 20 and $R^3$ is a trivalent carbyl radical having carbon atoms of from 1 to 20, is mixed with the components (A), (B) and (C) in an amount of 3 to 30% by weight based on the total amount of monomers (A), (B) and (C) to form a mixture which may be polymerized in a manner similar to that of the first aspect of this invention to produce a desirable transparent cast polymeric product.

According to a still further aspect of this invention, the component (E) is mixed with the components (A), (B), (C) and (D) in an amount of from 3 to 30% by weight based on the total amount of the latter four components to form a mixture which is adapted to use a polymerizable mixture in this invention.

Among the components (E), the compounds represented by the formula $R^1R^2OH$ wherein $R^1$ and $R^2$ are the same as defined above are more advantageously used for the process of this invention.

A person skilled in the art should note that ethyl methacrylate, methyl acrylate and ethyl acrylate may be used in each aspect of this invention as a substitute for methyl methacrylate.

The inventors of this invention have found that methyl methacrylate and/or its prepolymer are mixed with the components (B) and (C) in a proportion mentioned above to produce a transparent cast polymeric product having simultaneously heat resistance and chemical resistance as well as impact resistance whereby the defects of a polymethylmethacrylate can be dissolved.

By mixing methylmethacrylate with the components (B) and (C) in a manner according to this invention, the mixture may maintain a high rate of polymerization even at a considerably low temperature for example below the melting point of methylmethacrylate ($-48°$ C.), and a product to be produced has few defects such as strain and bubbles, whereby a cast polymeric product may be efficiently obtained in a extremely short period of time.

The reasons for this phenomenon are believed to be that the components (B) and (C) and therefore a mixture containing the components have properties such that they easily take a stable super-cooled state without crystallization at a considerably low temperature. Under this state, the system generally rapidly increases in viscosity as the temperature is lowered whereby the rate of polymerization is significantly increased and the change (decrease) in volume is low during polymerization to prevent optical strain and strain at adhesion area from taking place. Further, there is no expansion of entrained air nor vaporization of monomer to produce bubbles because the polymerization temperature is low enough to prevent the raise of temperature to an undesirable level.

Thus, the addition of the components (B) and (C) to the polymerizable mixture according to this invention realizes significant improvement of such properties as heat resistance, solvent resistance, surface hardness of polymethyl methacrylate and highly efficient cast polymerization.

The component (B) which is useful in this invention includes ethyl acrylate, ethyl methacrylate, propyl acrylate, propyl methacrylate, isopropyl acrylate, isopropyl methacrylate, isobutyl acrylate, isobutyl methacrylate, 1,3-butanediol monomethacrylate, 1,3-butanediol monoacrylate, 1,4-propanediol monomethacrylate, 1,4-propanediol monoacrylate, 1,5-pentanediol monomethacrylate, 1,5-pentanediol monoacrylate, 1,6-hexanediol monomethacrylate, 1,6-hexanediol monoacrylate, 1,7-heptanediol monomethacrylate, 1,7-heptanediol monoacrylate and a prepolymer of the same.

The components (C) which are suitable for use in this invention include glycidyl methacrylate, glycidyl acrylate, diethyleneglycol dimethacrylate, diethyleneglycol diacrylate, triethyleneglycol dimethacrylate, triethylene-glycol diacrylate, tetraethyleneglycol dimethacrylate, tetraethyleneglycol diacrylate, pentaethyleneglycol dimethacrylate, pentaethyleneglycol diacrylate, hexaethyleneglycol dimethacrylate, hexaethyleneglycol diacrylate, polyethyleneglycol dimethacrylate, polyethyleneglycol diacrylate, and a prepolymer of the same.

The term "prepolymer" used herein is regarded as a mixture of a monomer and its polymer which is obtained by polymerizing a monomer to a level such that the conversion is less than 30% or by mixing a monomer and its polymer in an amount less than 30% of the polymer. The prepolymer is used instead of all or a part of the monomer for the purpose of increasing the viscosity of the polymerizable mixture and decreasing the polymerization time of the monomer to be used. However, it should be noted that if a prepolymer containing more than 30% of polymer is used, the fabricability is reduced and the removal of entrained air becomes harder because of the increase in viscosity.

Specific examples of the components (D) which are useful in this invention are styrene, toluene, divinyl-benzene, α-methylstyrene, acrylic acid, acrylamide, acrylonitrile, methacrylic acid, methacrylamide, methacrylonitrile, vinyl acetate, vinyl propionate, vinyl butylate, vinyl stearate, vinyl pyridine, vinyl pyrrolidone, vinyl carbazole, maleic anhydride, itaconic acid, crotonic acid, diallyl phthalate, triallyl cyanurate, allyl acetate, diallyl maleate, diethyleneglycol-bis-allylcarbonate, trimethylolethane trimethacrylate, trimethylolpropane trimethacrylate, trimethylolpropane triacrylate, trimethylolethane triacrylate, glycelol monomethacrylate, neopentylglycol dimethacrylate, neopentylglycol diacrylate, tribromomethacryloxy phosphate, monobromomethacryloxy phosphate, benzyl methacrylate, toluyl methacrylate, phenyl methacrylate, benzyl acrylate, cyclohexyl methacrylate, 2-ethylhexyl methacrylate, lauryl methacrylate, cyclohexyl acrylate, stearyl methacrylate, furfuryl methacrylate, ethyleneglycol dimethacrylate and ethyleneglycol diacrylate.

Specific examples of the components (E) which are useful in this invention are propyleneglycol, diethyleneglycol, butanediol, triethyleneglycol, tetraethyleneglycol, pentanediol, hexanediol, nonanediol, decanediol, heptanediol, 2-ethylhexanediol, octanediol, neopentyleneglycol, ethyleneglycol monomethyl ether, ethyleneglycol monoethyl ether, ethyleneglycol monobutyl ether, glycerin, glycerol monoacetate, glycerol monobutylate, glycerol monopropionate, glycerol monolaurate, glycerol diacetate, glycerol dibutylate, trimethylolpropane monoacetate, trimethylolethane monoacetate, glycerol methyl ether, glycerol monobutyl ether, glycerol dimethyl ether and glycerol dibutyl ether.

When a compound represented by the formulae for the components (B) or (C) wherein n is an integer larger than that defined therein is used, the polymeric product obtained tends to be soft and, therefore, is undesirable.

If the compound used is represented by the formula for the component (E) except that the number of carbon atoms for $R^2$, $R^3$ or $R^4$ is larger than that defined for (E), the compatibility of the compound with other monomers becomes low and the product produced tends to be waxy.

The basic properties given for a transparent polymeric product, such as resistance to heat, chemicals, impact and weather, are due to the components (A), (B) and (C). However, in order to improve various properties such as flame retardancy, machinability especially for cutting, and antistatic property for specific use of the product, the component (D) is incorporated into a polymerizable mixture thereby generalizing the use of the product to be produced.

The component (E) is used for the purpose of further improving the impact resistance of the product. However, it is used in an amount such that the impact resistance is significantly improved without essentially reducing the heat resistance, more particularly in an amount of from 3 to 30% by weight, preferably 5 to 20% by weight based on the total amount of (A), (B), (C) and (D) because too much of the component (E) lowers the heat resistance.

According to the method of this invention, a mixture of (A), (B) and (C), and, if necessary, (D) and/or (E) is poured into a cell or mold. The cell or mold is designed to give a shaped product, such as plate, lens, tube, cylinder or sphere and is made of glass or a metal. The poured mixture is irradiated with light or an ionizing radiation to initiate the polymerization. When the mold or cell is made of a metal, the use of radiation is desired because light cannot generally penetrate the metal. The kinds of light useful in this invention include strong natural light condensed, for example, through a condensing lens, visible and ultraviolet light from a high pressure or low pressure mercury lamp, laser, strong light from photofactory, luminescence such as fluorescence or phosphorescence and the like. On the other hand, the ionizing radiation which may be used for the polymerization according to this invention includes any radiation which ionizes substances, such as alpha-rays, beta-rays, gamma-rays, X-rays, electron beams and mixed rays from a nuclear reactor or a fission product. The dose and the dose rate should be determined taking into consideration the other conditions for polymerization and the composition of the polymerizable mixture, but are usually in the range of from $10^3$ to $10^9$ preferably $10^4$ to $10^7$ roentgen/hr and in the range of from $10^3$ to $10^7$ preferably $10^5$ to $10^7$ roentgen, respectively.

An important feature of this invention resides in the cast polymerization at a temperature lower than room temperature by irradiating a monomer mixture of this invention with light or a kind of ionizing radiation. By mixing the components (B) and (C) with methyl methacrylate, a cast polymeric product with no or little defects such as strain and bubbles can be produced at a high rate of polymerization even at a temperature below room temperature, particularly at a considerably low temperature for a very short polymerization time. Thus, the cast polymerization can be advantageously and economically practiced according to this invention. The polymerization temperature useful in this invention suitably ranges from 0° C. to −100° C., most preferably from −30° to 80° C.

This invention is further illustrated by the following Examples wherein all "parts" and "percentages" are based on weight unless otherwise indicated.

EXAMPLE 1

Methyl methacrylate (30 parts), butyl acrylate (30 parts) and glycidyl methacrylate (30 parts) were mixed and the mixture was poured into a glass cell by which a sample 60 mm × 60 mm square and 10 mm thick can be formed, cooled to −78° C. and irradiated with gamma-rays from Co-60 at a dose rate of $1 \times 10^6$ roentgen/hour for 3 hours. The temperature of the sample was returned to room temperature, and an organic glass plate free from any defects such as strain and bubbles was obtained.

It was found that in order to obtain a sample plate same as the above mentioned sample from the mixture disclosed above, it was necessary to carry out the polymerization using benzoylperoxide as a catalyst in an amount less than 0.05% at 60° C. for 73 hours, or alternatively, to carry out the polymerization at 70° C. for 65 hours by the use of azobisbutylonitrile in an amount lower than 0.02%.

It was also found that when the mixture stated above is subjected to polymerization by irradiation of gamma-rays at room temperature, a product free from strain and bubbles could not be produced unless the mixture was irradiated with gamma-rays at a dose rate of $2 \times 10^5$ roentgen/hour for 10 hours. On the other hand, in case the polymerization of the same mixture was carried out at a temperature above 40° C., a product without the defects could be obtained only when the mixture was irradiated with gamma-rays at a dose rate lower than $5 \times 10^4$ roentgen/hour for 50 hours or longer.

The organic glass obtained according to the method of this Example had improved mechanical strength, such as impact resistance and the like, resistance to heat, and weather, surface hardness and transparency which are comparable to a conventional acrylic resin and was superior to an acrylic resin in resistance to solvents.

When methyl methacrylate was polymerized by pouring it into the glass cell identical to that mentioned above, a polymeric cast product free from strain and bubbles could be produced only when the polymerization was carried out by the use of benzoyl peroxide as the catalyst at a concentration up to 0.07% at 60° C. for 72 hours, or alternatively, by the use of azobisisobutylonitrile at a concentration lower than 0.03% at 70° C. for 65 hours.

EXAMPLE 2

Methyl methacrylate (50 parts), ethyl acrylate (30 parts) and diethyleneglycol diacrylate (20 parts) were mixed and the mixture was poured into a stainless steel mold by which a concave lens 60 cm in diameter can be obtained, cooled to −30° C. and irradiated with gamma-rays from Co-60 at a dose rate of $3 \times 10^5$ roentgen/hour at that temperature for 4 hours. The thus obtained cast product was a lens free from strain and bubbles.

It was found that in order to produce a lens free from strain and bubbles from the mixture mentioned above by the use of the same mold as the above without irradiation of gamma-rays, it was necessary to use a catalyst at a concentration lower than 0.05% and to heat at 60° C. for 59 hours or longer when the catalyst is t-butylhydroxy-peroxide, or alternatively, to use benzoylperoxide as a catalyst at a concentration lower than 0.05% and to heat to 60° C. for 55 hours or longer.

The copolymeric product obtained according to this Example had improved mechanical strength such as impact resistance and the like, resistance to heat, weather and solvents, surface hardness, light transmission and the like which are comparative to those of an acrylic resin plate.

EXAMPLE 3

Methyl methacrylate (20 parts), isobutyl methacrylate (20 parts) and tetraethyleneglycol diacrylate (30 parts) were mixed and the mixture was poured into a metal mold by which a concave mirror 60 cm in diameter can be formed, cooled to 0° C. and irradiated with gamma-rays from Co-60 at a dose rate of $2 \times 10^5$ roentgen/hour at that temperature for 5 hours to obtain a polymeric cast product free from optical strain and bubbles.

It was found that in case the monomer mixture above was polymerized without irradiation of gamma-rays, a polymeric cast product free from optical strain and bubbles could be obtained only when the polymerization was carried out by the use of benzoylperoxide at a concentration of 0.03% at 60° C. for 56 hours or longer.

The copolymer prepared according to this Example had improved properties superior to those of an acrylic resin plate, the properties being mechanical strength such as impact resistance, resistance to heat, weather and solvents, surface hardness, light trnasmission and the like.

EXAMPLE 4

Methyl methacrylate (30 parts), pentanediol monoacrylate (20 parts) and diethyleneglycol diacrylate (50 parts) were mixed and the mixture was poured into a glass cell adapted to form a polymeric plate 60 cm × 60 cm square and 15 mm thick. After sealing the cell with a polyvinylchloride ring packing to prevent the mixture from leaking, the mixture was irradiated with visible and ultraviolet light having maximum energy at 3,600 A from a high pressure mercury arc lamp located 15 cm away from the light source for 5 hours to obtain a polymeric cast product free from any defects such as optical strain and bubbles.

It was found that in order to produce a cast polymeric product free from strain and bubbles from the mixture specified above, without irradiation by light, it is required to polymerize it at 60° C. for 55 hours by the use of benzoylperoxide as the catalyst in an amount of 0.05%.

The copolymeric product prepared according to this Example had improved properties, for example, mechanical strength such as impact resistance, resistance to heat, weather and solvents, surface hardness, light transmission and the like which were comparable or superior to those of an acrylic resin plate.

EXAMPLE 5

Methyl methacrylate (40 parts), hexanediol monoacrylate (40 parts), tetraethyleneglycol diacrylate (20 parts) and hexanediol (15 parts) were mixed and the mixture was poured into a glass cell adapted to form a sample plate 100 cm × 100 cm square and 10 mm thick and irradiated with gamma-rays from Co-60 at a dose rate of $2 \times 10^5$ roentgen/hour at room temperature for 4 hours to obtain an organic glass plate free from optical strain and bubbles and having good appearance.

When the mixture specified above was polymerized by a conventional method without irradiation by gamma-rays, and the polymerization time was reviewed, it was found that to polymerize it at 60° C. for 58 hours or longer when benzoyl peroxide was used as the catalyst in an amount 0.05%.

The copolymeric product prepared according to this Example had improved properties, for example, resistance to heat, solvents and weather, surface hardness, transparency and mechanical strength such as impact resistance which were superior to those of an acrylic resin plate. In particular, the impact resistance of the copolymeric product of this Example was 28.6 kg/cm$^2$ as Izod value which was far superior to the 19.2 kg/cm$^2$ of a conventional acrylic resin plate. A copolymeric product which was prepared in a manner similar to this Example except that hexanediol was omitted had an Izod value of 22.2 kg/cm$^2$.

EXAMPLE 6

Methyl methacrylate (20 parts), butanediol monoacrylate (20 parts), diethyleneglycol diacrylate (60 parts) and glycerol diacetate (20 parts) were mixed and the mixture was poured into a cell made of thin glass plates adapted to form a sample plate 35 cm × 35 cm square and 8 mm thick, kept at a temperature of from −50° to −78° C. on dry ice and irradiated with electron beams from a 2 MeV electron accelerator at a dose of $5 \times 10^5$ rad/sec. for 10 seconds. After the completion of irradiation, the temperature of the mixture was returned to room temperature to promote the polymerization to obtain a cast polymeric product free from optical strain and bubbles.

When the mixture above was polymerized in a conventional way without irradiation of ionizing radiation or light, a copolymeric product free from strain and bubbles could be obtained only when the polymerization was carried out at 70° C. for 46 hours by the use of azobisisobutylonitrile in an amount of 0.08% based on the mixture.

The copolymeric product obtained according to this Example had improved properties, for example, resistance to heat, solvents and weather, surface hardness, transparency and mechanical strength such as impact resistance which were comparable or superior to those of a conventional acrylic resin plate. Especially, it was found that the product produced according to this Example had an Izod value of 29.9 kg/cm$^2$ which was far higher than the 19.7 kg/cm$^2$ of a conventional acrylic resin plate. On the other hand, a polymeric product polymerized from the mixture above except that glycerol diacetate was omitted had an Izod value of 23.5 kg/cm$^2$ which was also lower than that of the product according to this Example.

EXAMPLE 7

Methyl methacrylate (30 parts), propyl methacrylate (30 parts), polyethyleneglycol dimethacrylate (30 parts) and trimethylolpropane trimethacrylate (10 parts) were mixed and the mixture was poured into a metal mold adapted to form a tube of 3.5 cm diameter and of 20 cm length, cooled to −30° C. and at that temperature irradiated with gamma-rays from Co-60 at a dose rate of $5 \times 10^5$ roentgen/hour for 2 hours to obtain a tubular cast polymeric product free from strain and bubbles.

It was found that if the mixture specified above was polymerized in the same mold as mentioned above without irradiation, a cast polymeric product free from strain and bubbles could be obtained only when cumenehydroperoxide was incorporated into the mixture at a concentration of 0.05% and polymerization was carried out at 60° C. for 34 hours.

It was also found that the product obtained according to this Example was significantly superior to a product in the same manner above from the mixture containing no trimethylolpropane trimethacrylate in resistance to solvents, chemicals and heat, characteristics being required in a flowmeter.

What is claimed is:

1. A process for efficiently producing a transparent shaped polymeric product free from defects such as bubbles and strain, of sufficiently high physical properties, such as surface hardness, weather resistance and impact resistance, to serve as a substitute for inorganic glass, consisting essentially of the steps of: mixing
    (A) methyl methacrylate or its prepolymer,
    (B) a monomer represented by the formula

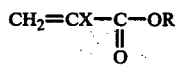

or

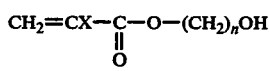

wherein X is H or $CH_3$, R is alkyl having 2-6 carbon atoms and n is an integer of from 3 to 7, a mixture of the monomers or a prepolymer thereof, and
    (C) a monomer represented by the formula

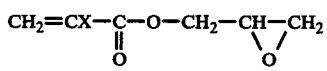

or

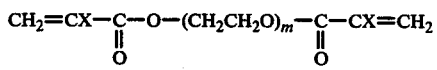

wherein X is H or $CH_3$ and m is an integer of from 2 to 4, a mixture of the monomers, or a prepolymer thereof, the amount each of the components (A), (B) and (C) ranging from 20 to 50% by weight and the total amount of the components being 100% by weight;
pouring the resulting mixture into a cell or mold for cast polymerization; and
irradiating said mixture with light or ionizing radiation at a temperature below room temperature to polymerize said mixture.

2. A process according to claim 1 wherein said component (B) is a compound represented by the formula

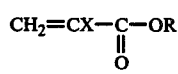

wherein X is H or $CH_3$ and R is alkyl having 4-6 carbon atoms.

3. A process according to claim 1 wherein said component (C) is a compound represented by the formula

wherein X is H or $CH_3$ and m is an integer of from 2 to 4.

4. A process according to claim 1 wherein said irradiation is carried out with ionizing radiation at a dose rate of from $10^3$ to $10^9$ roentgen/hour with the total dose ranging from $10^3$ to $10^7$ roentgen.

5. A process according to claim 1 wherein said irradiation is carried out with ionizing radiation at a dose rate of from $10^4$ to $10^7$ roentgen/hour with the total dose ranging from $10^5$ to $10^7$ roentgen.

6. A process according to claim 1 wherein said irradiation is carried out with gamma-rays or electron beams.

7. A process according to claim 1 wherein said polymerization is carried out at a temperature of from 0° C. to −100° C.

8. A process according to claim 1 wherein said polymerization is carried out at a temperature of from −30° to −80° C.

9. A process according to claim 1 wherein a component (D) being a monomer copolymerizable with the components (A), (B) and (C) or a mixture of the monomers is added to the mixture of the components (A), (B) and (C) in an amount of less than 20% by weight based on the total amount of the components (A), (B) and (C).

10. A process according to claim 1 wherein a component (E) being one or more compounds represented by the formula

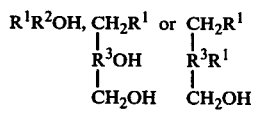

wherein $R^1$ is —OH, —$OR^4$ or —$OOCR^4$ in which $R^4$ is alkyl having 1-20 carbon atoms; $R^2$ is straight or branched chain alkylene having 1-10 carbon atoms or $$-CH_2CH_2(OCH_2CH_2)_l-$$

wherein l is an integer of from 1 to 20 and $R^3$ is a trivalent carbyl radical having 1-20 carbon atoms is mixed with the components (A), (B) and (C) in an amount of from 3 to 30% by weight based on the total amount of the components (A), (B) and (C).

11. A process according to claim 10 wherein said component (E) is a compound represented by the formula

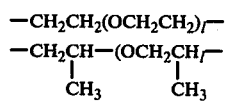

wherein $R^1$ is —OH, —$OR^4$ or —$OOCR^4$ in which $R^4$ is alkyl having 1-20 carbon atoms.

12. A process according to claim 9 wherein a component (E) being one or more compounds represented by the formula

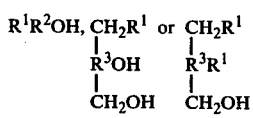

wherein $R^1$ is —OH, —$OR^4$ or —$OOCR^4$; in which $R^4$ is alkyl having 1-20 carbon atoms; $R^2$ is straight or branched chain alkylene having 1-10 carbon atoms or $$-CH_2CH_2(OCH_2CH_2)_l-$$

$$-CH_2CH-(OCH_2CH)_l-$$
$$\phantom{-CH_2}|\phantom{-(OCH_2}|$$
$$\phantom{-CH_2}CH_3\phantom{-(OC}CH_3$$

wherein l is an integer of from 1 to 20 and $R^3$ is a trivalent carbyl radical having 1–20 carbon atoms is mixed with the components (A), (B), (C) and (D) in an amount of from 3 to 30% by weight based on the total amount of monomers (A), (B), (C) and (D).

13. A process according to claim 12 wherein said component (E) is a compound represented by the formula $$R^1R^2OH$$

wherein $R^1$ is —OH, —$OR^4$ or —$OOCR^4$ in which $R^4$ is alkyl having 1–20 carbon atoms and $R^2$ is a straight or branched chain alkylene having 1–10 carbon atoms.

* * * * *